US007769585B2

(12) United States Patent
Wahab

(10) Patent No.: US 7,769,585 B2
(45) Date of Patent: Aug. 3, 2010

(54) SYSTEM AND METHOD OF VOICE ACTIVITY DETECTION IN NOISY ENVIRONMENTS

(75) Inventor: Sami R. Wahab, Melbourne, FL (US)

(73) Assignee: Avidyne Corporation, Lincoln, MA (US)

( * ) Notice: Subject to any disclaimer, the term of this patent is extended or adjusted under 35 U.S.C. 154(b) by 789 days.

(21) Appl. No.: 11/784,216

(22) Filed: Apr. 5, 2007

(65) Prior Publication Data

US 2008/0249771 A1 Oct. 9, 2008

(51) Int. Cl.
*G10L 15/20* (2006.01)

(52) U.S. Cl. .................................................... 704/233

(58) Field of Classification Search .................. 704/233
See application file for complete search history.

(56) References Cited

U.S. PATENT DOCUMENTS 7,461,002 B2 * 12/2008 Crockett et al. ............. 704/278
7,565,288 B2 * 7/2009 Acero et al. ................ 704/226

OTHER PUBLICATIONS

Deller, Jr., J. R., et al. "Short-Term Processing of Speech." In *Discrete-Time Processing of Speech Signals* (New York: John Wiley & Sons, Inc.), pp. 246-251 (1999).
Kondoz, A. M., "Voice Activity Detection." In *Digital Speech: Coding for Low Bit Rate Comminucation Systems* (John Wiley & Sons, Ltd), pp. 357-364 (2004).
Ramirez, J., et al. "Efficient voice activity detection algorithms using long-term speech information," *Speech Communication*, 42: 271-287 (2004).

* cited by examiner

*Primary Examiner*—Susan McFadden
(74) *Attorney, Agent, or Firm*—Hamilton, Brook, Smith & Reynolds, P.C.

(57) ABSTRACT

An efficient voice activity detection method and system suitable for real-time operation in low SNR (signal-to-noise) environments corrupted by non-Gaussian non-stationary background noise. The method utilizes rank order statistics to generate a binary voice detection output based on deviations between a short-term energy magnitude signal and a short-term noise reference signal. The method does not require voice-free training periods to track the background noise nor is it susceptible to rapid changes in overall noise level making it very robust. In addition a long-term adaptation mechanism is applied to reject harmonic or tonal interference.

20 Claims, 2 Drawing Sheets

SYSTEM AND METHOD OF VOICE ACTIVITY DETECTION IN NOISY ENVIRONMENTS

BACKGROUND OF THE INVENTION

An important problem in many areas of speech processing is the determination of active speech periods within a given audio signal. Speech can be characterized as a discontinuous signal since information is carried only when someone is talking. The regions where voice information exists are referred to as voice-active segments and the pauses between talking are called voice-inactive or silence segments. The task of determining which class an audio segment belongs to is generally approached as a statistical hypothesis problem where a decision is made based on an observation vector, commonly referred to as a feature vector. One or many different features may serve as the input to a decision rule that assigns the audio segment to one of the two given classes. It is effectively a binary decision problem where performance trade-offs are made trying to maximize the detection rate of active speech while minimizing the false detection rate of inactive segments. But generating an accurate indication of the presence of speech, or lack there of, is generally difficult especially when the speech signal is corrupted by background noise or unwanted interference.

In the art, an algorithm employed to detect the presence or absence of speech is referred to as a voice activity detector (VAD). Many speech-based applications require VAD capability in order to operate properly. For example in speech coding, the purpose is to encode raw audio such that the overall transferred data rate is reduced. Since information is only carried when someone is talking, clearly knowing when this occurs can greatly aid in data reduction. The more accurate the VAD the more efficient a speech coder algorithm can operate. Another example is speech recognition. In this case, a clear indication of active speech periods is critical. False detection of active speech periods will have a direct degradation effect on the recognition algorithm. VAD is an integral part to many speech processing systems. Other examples include audio conferencing, echo cancellation, VoIP (voice over IP), cellular radio systems (GSM and CDMA based) and hands-free telephony.

Many different techniques have been applied to the art of VAD. It is not uncommon for an algorithm to utilize a feature vector consisting of such features as full-band energy, sub-band energies, zero-crossing rate, cepstral coefficients, LPC (linear predictive coding) distance measures, pitch or spectral shape. Most have adaptive thresholds. Some algorithms require training periods to adapt to the environment or the actual speaker. Noise reduction techniques, such as wiener filtering or spectral subtraction, are sometimes employed to improve the detection performance. Other less common approaches that utilize HMMs (hidden Markov models), wavelet transforms, and fuzzy logic, have been studied and reported in the literature. Some algorithms are more successful then others, depending on the criteria. But in general, none will ever be a perfect solution to all applications because of the variety and varying nature of natural human speech and background noise.

Since it is an inexact science, like many areas in speech processing, attempts have been made over the years to propose standardized algorithms for communication purposes. The International Telecommunication Union-Telecommunication Standardization Sector (ITU-T) is the govern body for proposed VAD standards. These standardized algorithms are generally proposed to accompany certain communication protocol standards, such as GSM for example. For further study on VAD algorithms and a useful comparison matrix between different methods please see, "Digital Speech", A. Kondoz, 2004 John Wiley & Sons, Ltd, pages 357-377.

The disadvantage with current VAD algorithms is that they generally require feedback knowledge of the detector state to determine when to run background noise adaptation. Adaptive thresholds are meant to track the noise and thus must update only when someone is not talking. A false detect can cause the algorithm to be stuck on or worst-case be stuck off. A reset mechanism is usually included to clear the state after a certain timeout period is exceeded. Another issue is that most algorithms work well only at higher SNR (signal to noise ratio) and these approaches generally include techniques for noise reduction to improve performance. But these methods are not very effective in the presence of non-Gaussian non-stationary background noise. Another issue is that most techniques with better than average performance require significant processing in order to transform the input audio into the multi-feature vector usually required by the algorithm. This limits the use of many good algorithms to only non-real time applications or to systems that can afford the extra processing burden.

SUMMARY OF THE INVENTION

The present invention is a novel approach for detecting human voice corrupted by non-Gaussian non-stationary background noise. The method is simple in terms of implementation complexity but yields a highly accurate word detection rate. The method utilizes rank order statistics to produce a short-term energy magnitude signal and a short-term noise reference signal. Detection is done by comparing the deviations of these signals. The method also provides long-term adaptation to normalize the spectral magnitude of the input to improve detection probability. Active normalization of the spectral magnitude enables this detector to work reliably in severe environments such as automotive or aviation cockpits.

In a referenced embodiment, the invention method and system for voice activation of a microphone comprises:

- transforming analog signals from a microphone into digital frequency spectrum arrays;
- applying adaptive normalizing coefficients to each digital frequency spectrum array, resulting in normalized arrays;
- grouping a predetermined number of time-consecutive normalized arrays, including a most recent normalized array;
- determining a maximum sound energy array across the group of normalized arrays;
- determining a maximum value and a minimum value in the maximum value array; and
- activating a microphone switch when the difference between the maximum value and the minimum value in the maximum value array exceeds a threshold.

The invention has the following features:

1. Short-term noise reference is measured all of the time, including when someone is speaking. This means there is no dependence on what state the detector is in, thus eliminating the possibility of "lock-up".
2. Detection is based on short-term statistics, rapid changes in the overall background noise will generate a relatively low false detection rate. (i.e. an example would be someone rolling up a window in a moving car).
3. Harmonic or tonal interference are rejected due to a long-term adaptation mechanism.

4. The method is effective at low SNR.
5. Implementation complexity is very low, suitable for cheap embedded micro-controllers.
6. The method is language independent.
7. The processing utilized by this method is scalable. (i.e. loose dependency on sample rate, frame buffer size, number of FFT bins, etc . . . ).
8. The method does not require any floating-point operations. The entire algorithm can be implemented using real-time fixed-point processing.

It is an object of the present invention to provide a method of voice activity detection that utilizes rank order statistics to produce a short-term energy magnitude signal, stEn, and a short-term noise reference signal, stRef.

It is an object of the present invention to compare the deviations between stEn and stRef to produce a binary decision of voice active or voice inactive per frame.

An advantage of this invention is that stEn and stRef are computed all of the time and are not dependent on the current state of the detector, thus eliminating the possibility of lock-up.

An advantage of this invention is that it provides a robust response in non-stationary noise because the VAD decision is based on short-term statistics, thus rapid changes in noise will not greatly increase the false detection rate.

It is an object of the present invention to compute an FFT magnitude, with N bins, of the input signal from each frame buffer.

It is an object of the present invention to normalize the FFT magnitude of the input such that the long-term response of each bin has equal energy.

An advantage of this invention is that Harmonic or tonal interference are rejected due to the long-term adaptation mechanism.

It is an object of the present invention to maintain a delay line of M×N elements, where there are M number of N bins of normalized FFT magnitudes.

It is an object of the present invention to produce a 1×N vector, maxSpEn, per frame that contains the maximum value of each bin from the M×N delay line.

It is an object of the present invention that stEn be computed as the maximum value of vector maxSpEn, per frame.

It is an object of the present invention that stRef be computed as the minimum value of vector maxSpEn, per frame.

It is an object of the present invention to find the minimum value of each element in vector maxSpEn over K sample periods and apply the 1×N result to normalize the FFT magnitudes.

An advantage of this invention is effective operation at low SNR.

An advantage of this invention is that its implementation complexity is very low making this method suitable for real-time operations on inexpensive micro-controllers. Another advantage of this method is scalability in terms of sample rate, frame buffer size, FFT bin size, etc . . .

An advantage of this invention is that the entire algorithm may be implemented using fixed-point processing. No floating-point operations are required.

An advantage of this invention is that it is language independent.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
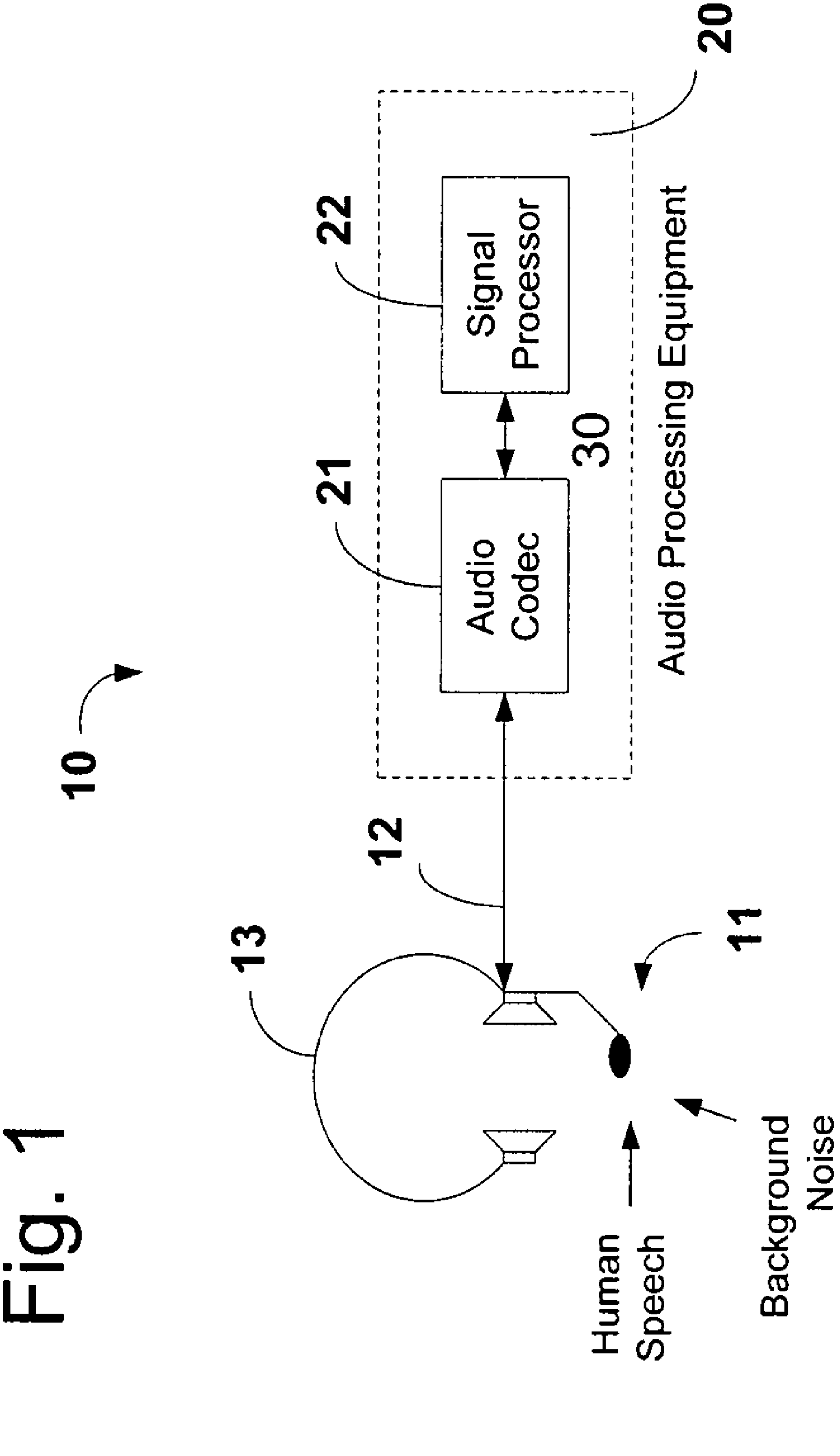
FIG. 1 is a block diagram of a representative apparatus of embodiments of the present invention.

FIG. 1 illustrates a representative embodiment for the present invention, referred to herein by the general reference number 10. The apparatus comprises a headset 13 with a single boom microphone 11 connected to an audio processing system 20 via a coaxial cable 12. The audio processing equipment 20 includes an audio band CODEC (Coder/Decoder) 21 that digitizes the microphone audio (input) from 11 and provides reconstructed audio (output) to the headset 13. The audio CODEC 21 is connected to a signal processor 22 such that audio samples are passed between each device (21 and 22) at the desired sample rate. In this embodiment, the sample rate is about 8 kHz, however this parameter may be any value desired by the target system. The actual value of the sample rate is not important. Human voice corrupted by background noise is applied to the input of the microphone 11. The input audio is digitized by 21 and processed by 22 where the implementation (e.g., detection process/switch 30 of FIG. 1) of this invention resides.

Figure 2:
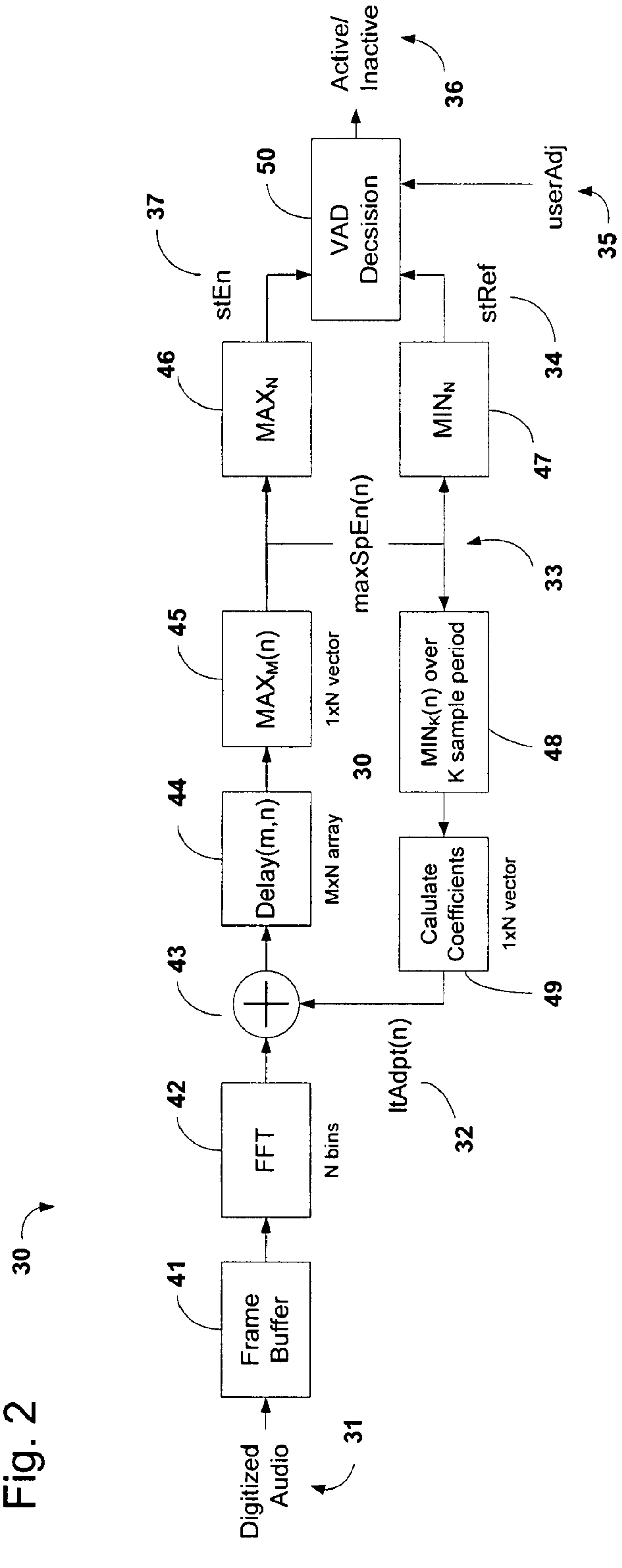
FIG. 2 is a block diagram of an embodiment of the present invention.

FIG. 2 illustrates the embodiment (voice activation switch/voice detector) of the present invention, referred to herein by the general reference number 30. Digitized audio 31 is collected by a frame buffer 41. In this embodiment, the frame buffer collects 5 msec worth of non-overlapping samples. The size of the frame buffer 41 may be any value required by the target system. However, it is not recommended to exceed 50 msec because of the nature of the detector. Also, overlapping frames may be utilized if so desired since it will not effect the basic operation of this invention.

The output from the frame buffer 41 is a vector of audio samples. In this embodiment, the output from 41 is a 1×40 vector. The first 32 elements of this vector are frequency transformed by FFT (Fast Frequency Transform) module 42. FFT module 42 applies a hamming window to the 1×32 input vector and calculates the short-term DFT using a real fixed-point FFT algorithm where N=16. The magnitude of the FFT is then computed in log base 2 and stored in a Q10 format. Note that the type, size, and format of the FFT and windowing function may depend on the target system and are not critical parameters here.

The 1×N output from FFT module 42 is summed by Adder 43 with the 1×N vector ltAdpt 32 to produce a 1×N vector. The output from Adder 43 is applied to an M×N delay buffer 44 where a new column replaces the oldest column of data every frame. In this embodiment M=13 (65 msec) but this parameter can be variable depending on the target system. It is not recommended to exceed 120 msec to prevent missing periods of short utterances. Once per frame, the M×N delay buffer 44 is evaluated by MAX module 45 to produce a 1×N vector containing the maximum value per bin across the M columns. The output from MAX module 45 is referred to as maxSpEn 33 which represents a maximum sound energy array.

This signal 33 is used as input to the feedback loop and the feedforward network of the detector. In the feedback loop, block 48 measures maxSpEn 33 over K sample periods to find the minimum value of each bin within that time frame. The result is a 1×N vector. The measurement is memory-less in time, meaning that block 48 is not a delay buffer as is implemented in buffer 44. After a K sample period is terminated, new coefficients are calculated at 49 to update the feedback signal ItAdapt 32 and block 48 is reset to begin a new K sample period. In particular, block 49 calculates coefficients that when applied to minimum value array output from block 48 results in equal values of sound energy at each frequency bin. In this embodiment K=200, or 1 second. As with the other parameters, K is adjustable but should be within the range of 500 ms to 2 sec for proper operation with standard speech.

In the feedforward path after MAX module 45, element 46 determines the short-term energy magnitude signal stEn 37 as the maximum value of the 1×N vector maxSpEn 33. Also, element 47 determines the short-term noise reference signal stRef 34 as the minimum value of 1×N vector maxSpEn 33. Both stEn 37 and stRef 34 are compared by the VAD decision rule in rule engine 50. For example, if the difference between stEn 37 and stRef 34 exceeds a threshold, then rule engine 50 determines a voice active state is detected. If the difference does not exceed the threshold, the rules engine 50 determines a voice inactive state is detected. The threshold may be in the range of 50% of stEn or lower. An optional user adjustment signal, userAdj 35, is applied to rule engine 50 to allow a comfort adjustment (via adjusting the threshold) by the user. The result of rule engine 50 is the binary decision of voice active or voice inactive 36 for the given 5 ms frame.

In operation (FIG. 1), voice activation switch (voice activity detection process) 30 determines whether subject audio input data received from microphone 11 is an active voice segment or inactive voice segment. Upon making a determination, signal processor 22 and audio CODEC 21 respond (to switch/detector 30 output) accordingly. That is, with a switch/detector 30 output of a voice active determination, signal processor 22 treats the received audio input as speech data (active speech signals). With a switch/detector 30 output of a voice inactive determination, signal processor 22 treats the subject audio input as noise or effectively silence data (inactive signals). Corresponding operations of devices 21 and 22 are then as common in the art. It is noted that in the presence of high noise, switch/detector 30 provides proper determination of active speech signals and has a relatively low false detection rate. It is further noted that switch (detection process) 30 accomplishes the foregoing without costly (in processing power) floating point operations but instead uses efficient matrix operations.

Accordingly, the present invention provides a voice activated switch in the presence of high noise (low signal to noise ratio environment). Said another way, the present invention is a high noise microphone. Application (uses) include pilot or driver communication systems, microphones in other high noise (low SNR) environments, and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for voice activation of a microphone comprising:

transforming analog signals from a microphone into digital frequency spectrum arrays;

applying adaptive normalizing coefficients to each digital frequency spectrum array, resulting in normalized arrays;

grouping a predetermined number of time-consecutive normalized arrays, including a most recent normalized array;

determining a maximum sound energy array across the group of normalized arrays;

determining a maximum value and a minimum value in the maximum sound energy array; and activating a microphone switch when the difference between the determined maximum value and the minimum value in the maximum sound energy array exceeds a threshold.

2. The method of claim 1 wherein the adaptive normalizing coefficients are repeatedly determined by:

accumulating a certain number of time-consecutive maximum sound energy arrays;

determining the minimum sound energy for each frequency bin from the accumulated certain number of time consecutive maximum sound energy arrays, resulting in a minimum value array; and determining normalizing coefficients that, when applied to the minimum value array, result in equal values of sound energy at each frequency bin.

3. The method of claim 1 wherein transforming analog signals from a microphone into digital frequency spectrum arrays comprises:

transforming analog signals from a microphone into a digital signal;

sampling the digital signal for predetermined periods of time, resulting in a framed sample for each period of time; and transforming each framed sample into an array in which each bin of the array represents a discrete frequency and the value of each bin represents the average of sound energy of the frequency of the bin over the time period of the framed sample.

4. The method of claim 3 wherein transforming each framed sample into an array in which each bin of the array represents a discrete frequency and the value of each bin represents the average of sound energy of the frequency of the bin over the time period of the framed sample includes applying a Fast Frequency Transform to the framed sample for each period of time.

5. The method of claim 1 wherein determining a maximum sound energy array across the group of normalized arrays includes:

determining a maximum value array, in which the bins of the maximum value array represent the same frequencies as the normalized arrays, and the value of the bins of the maximum value array are the maximum sound energy values across the grouped normalized arrays.

6. The method of claim 1 wherein the threshold is adjustable by the microphone user.

7. The method of claim 1 wherein the microphone is in an environment with a low signal-to-noise ratio.

8. A system for providing hands-free microphone switch activation comprising:

a microphone;

a CODEC to transform analog signals from the microphone into digital signals;

an activity detector that:

transforms the digital signal into frequency spectrum arrays;

applies adaptive normalizing coefficients to each frequency spectrum array, resulting in normalized arrays;

groups a predetermined number of time-consecutive normalized arrays, including the most recent normalized array;

determines a maximum sound energy array across the group of normalized arrays;

determines a maximum value and a minimum value in the maximum sound energy array; and activates a microphone switch when the difference between the maximum value and the minimum value in the maximum sound energy array exceeds a threshold.

9. The system of claim 8 wherein the activity detector further repeatedly determines the normalizing coefficients by:

accumulating a certain number of time-consecutive maximum sound energy arrays;

determining the minimum sound energy for each frequency bin from the accumulated certain number of time consecutive maximum sound energy arrays, resulting in a minimum value array; and determining normalizing coefficients that, when applied to the minimum value array, result in equal values of sound energy at each frequency bin.

10. The system of claim 8 wherein the activity detector transforms the digital signal into frequency spectrum arrays by:

sampling the digital signal for predetermined periods of time, resulting in a framed sample for each period of time; and transforming each framed sample into an array in which each bin of the array represents a discrete frequency and the value of each bin represents the average of sound energy of the frequency of the bin over the time period of the framed sample.

11. The system of claim 10 wherein the computing device transforms each framed sample into an array in which each bin of the array represents a discrete frequency and the value of each bin represents the average of sound energy of the frequency of the bin over the time period of the framed sample by executing software instructions that cause the computer to apply a Fast Frequency Transform to the framed sample for each period of time.

12. The system of claim 8 wherein the activity detector determines a maximum sound energy array across the group of normalized arrays by determining a maximum value array, in which the bins of the maximum value array represent the same frequencies as the normalized arrays, and the value of the bins of the maximum value array are the maximum sound energy values across the grouped normalized arrays.

13. The system of claim 8 further comprising an adjustment device by which the threshold is user adjustable.

14. The system of claim 8 wherein the microphone is located in a low signal-to-noise environment.

15. The system of claim 14 wherein the environment is any one of an airplane cockpit and drivers area of a car.

16. A computer implemented method of activating a microphone switch comprising:

receiving sound energy from audio input to a subject microphone;

normalizing sound energy across a range of frequencies using coefficients determined using a history of sound energy;

detecting deviations between normalized short term magnitudes and short term noise reference sound energy at each of the frequencies; and activating the microphone switch when the detected deviations reach a threshold value.

17. The system of claim 16 wherein at least one of the steps of normalizing and detecting employ matrix operations.

18. The system of claim 16 wherein the microphone is in an environment with a low signal-to-noise ratio.

19. The system of claim 18 wherein the environment is any one of an airplane cockpit and drivers area of a car.

20. The system of claim 16 wherein the threshold value is user adjustable.

* * * * *